Figure 1:
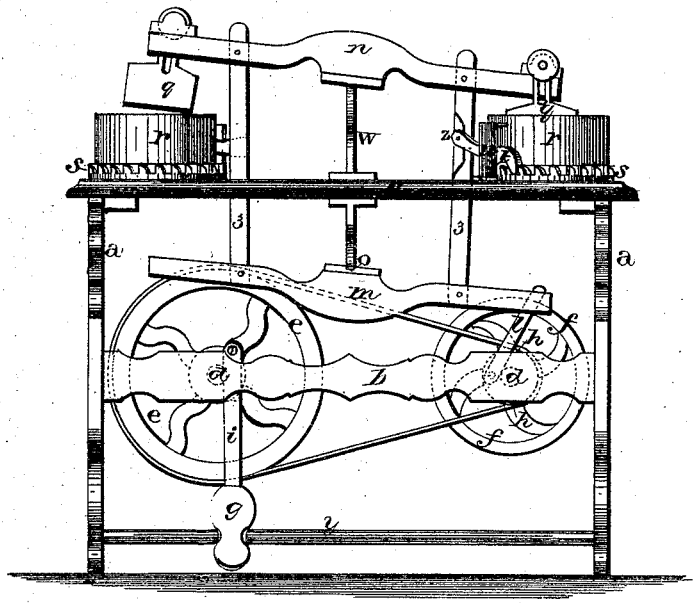
Figure 2:
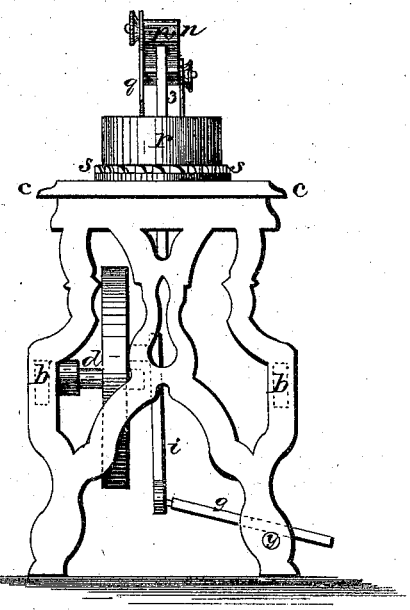

B. A. WILTON.
Meat-Cutters.

No. 156,616.

Patented Nov. 3, 1874.

WITNESSES.
J. Wm. Garner.
T. F. Lehmann

INVENTOR.
Benj. A. Wilton
per
F. A. Lehmann
Atty

UNITED STATES PATENT OFFICE.

BENJAMIN A. WILTON, OF WEST NEW BRIGHTON, NEW YORK.

IMPROVEMENT IN MEAT-CUTTERS.

Specification forming part of Letters Patent No. 156,616, dated November 3, 1874; application filed October 16, 1874.

*To all whom it may concern:*

Be it known that I, BENJAMIN A. WILTON, of West New Brighton, in the county of Richmond and State of New York, have invented certain new and useful Improvements in Meat-Choppers; and I do hereby declare the following to be a full, clear, and exact description of the invention, such as will enable others skilled in the art to which it pertains to make and use it, reference being had to the accompanying drawings, which form part of this specification.

My invention relates to an improvement in meat-choppers; and consists in a fly-wheel operated by a treadle, and which communicates motion through a belt and pulley to a walking-beam, which beam not only operates a chopper secured to each end, but also the dogs by which both of the tubs are caused to revolve.

The accompanying drawing represents my invention.

$a$ represents a frame, braced at $b\ b'$ in front and rear, and has a table or platform, $c$, resting on the top. Projecting from the brace $b'$, under the table, are two arms, $d$, and on their ends are journaled the wheels $e$ and $f$, of which $e$ is a driving-wheel moved by the foot-treadle $g$, pivoted upon rod $y$, and the crank $i$. The smaller one, $f$, of the two wheels has a pulley, $h$, for a belt to pass over from the wheel $e$. This smaller wheel $f$ is attached, by means of the connecting-rod $l$, to the end of the beam $m$, which beam is pivoted at its center $o$ on a hanger under the table. This beam is also connected by two connecting-rods, 3, which pass upward through the table $c$, with another beam, $n$, on the top, which beam $n$ is supported by a standard, $w$, upon which it vibrates. At each end of the upper beam are attached by set-screws the slotted choppers $q$, which can be adjusted up or down, as may be required. Two cylindrical tubs or vessels, $r$, of suitable size are fastened on the table by pivots, upon which they turn, and around the lower edge of which are secured the ratchets $s$, to be operated by the dogs $t$, which are pivoted to the connecting-rods 3, above the table, at $z$. The tubs $r$ are placed under the choppers $q$, and rotate upon their pivots, being alternately forced around by the dogs as the beam rises or descends, and consequently a new surface is constantly presented to the edge of the choppers. The dogs are held in position by the guards $u$.

Meat or vegetables being placed in the tubs, nothing more is required to work the choppers than to use the treadle, the cutters having previously been properly adjusted. By means of the treadle, fly-wheel, and walking-beam, I am enabled to operate two choppers and two tubs, and thus can do double the amount of work usually performed with the same or less expenditure of power, and at the same time leave the hands of the operator free to do other work.

Having thus described my invention, I claim—

The combination of the beams $m\ n$, cutters $q$, connecting rod or rods 3, dogs $t$, tubs $r$, and a treadle and fly-wheel for operating them, substantially as shown and described.

BENJAMIN A. WILTON.

In presence of—
JNO. J. CHOTE,
EDWARD B. MERRILL.